United States Patent Office 3,381,195
Patented Apr. 30, 1968

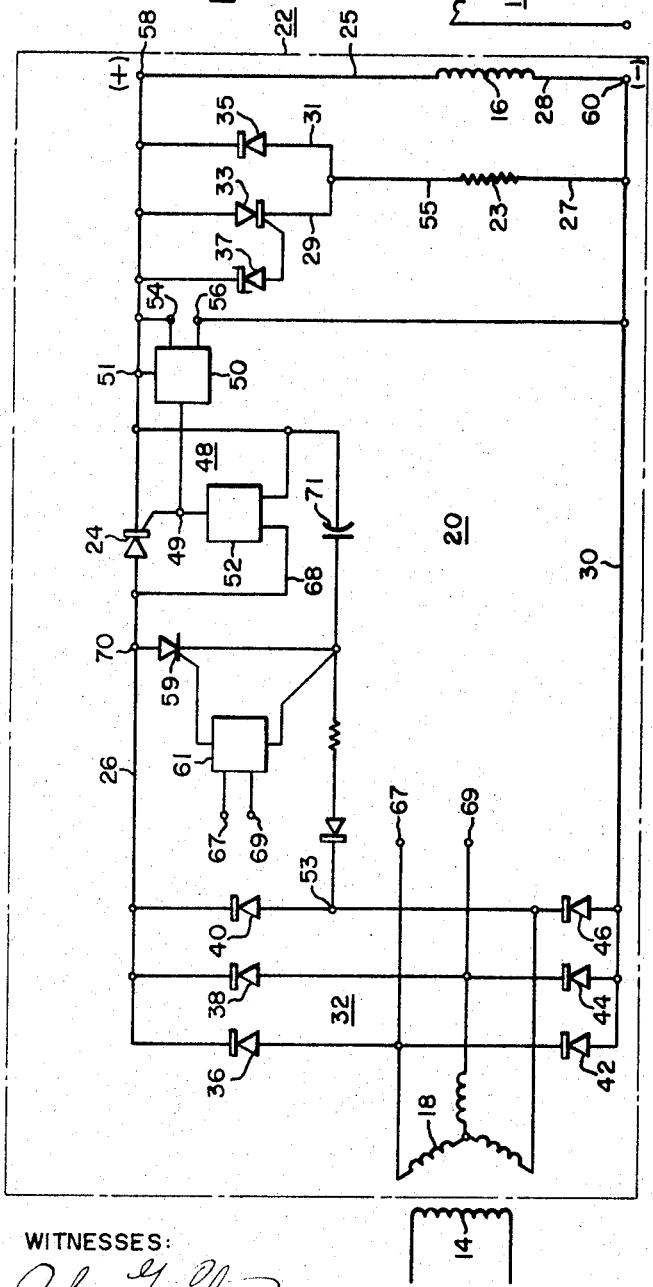

3,381,195
EXCITATION CONTROL SYSTEM FOR
SYNCHRONOUS MOTORS
Arthur H. Hoffmann, Monroeville, Pa., assignor to Westinghouse Electric Corporation, Pittsburgh, Pa., a corporation of Pennsylvania
Filed Oct. 7, 1965, Ser. No. 493,783
2 Claims. (Cl. 318—174)

ABSTRACT OF THE DISCLOSURE

A static control system for applying excitation to synchronous motors, especially of the brushless type, by firing a semiconductor switch to apply direct current excitation to the field of the motor. A firing circuit is provided for firing the switch in response to the voltage across the switch if the motor pulls into synchronism before the switch is fired.

---

The present invention relates to synchronous motor control and excitation systems, and more particularly to brushless systems in which DC excitation is applied to the motor field winding after synchronous speed is reached if for any reason it has not previously been applied.

Generally, the excitation system for a synchronous motor includes a field discharge circuit for discharging induced field current during the start-up period and a DC excitation circuit for energizing the motor field winding at synchronous speed as well as during a predetermined terminal interval of the start-up period to cause the motor to pull into synchronism. The presynchronization application of DC excitation to the field winding is ordinarily necessary to develop the pull-in torque required to synchronize the motor. While the present invention is generally applicable to any type of synchronous motor, it is particularly suitable for brushless synchronous motors such as are disclosed in a copending application entitled "Brushless Synchronous Motor Control System and Circuitry Therefor," Ser. No. 368,484, filed by F. V. Frola on May 19, 1964, and assigned to the present assignee. As indicated in that application, switching devices and other components in the control circuitry of a brushless synchronous motor preferably are solid state or static devices since they are shaft-mounted and subjected to forces of rotation.

Although the control circuitry is normally required to apply and normally does apply DC excitation to the field winding within a predetermined time interval of the slip voltage waveform, operating conditions can be such as to result in motor synchronization without the application of DC excitation in the start-up period. Thus, if the motor starts with little or no load, so as to accelerate toward synchronous speed very rapidly, the motor can synchronize as a result of saliency of the rotor pole pieces. From a theoretical standpoint, DC excitation could nonetheless be applied during an end interval of the start-up period, but under the conditions of rapid acceleration the control circuitry may be nonresponsive and thus fail to close the DC excitation circuit. Accordingly, the DC excitation circuit remains open under such circumstances to withhold the DC excitation which is needed for maintaining synchronous speed under load even though it had not been needed to reach synchronous speed.

In accordance with the principles of the present invention, a synchronous motor system includes a DC excitation circuit and a circuit for discharging induced field current. A semiconductor exciter switch is included in the excitation circuit for controlling application of DC excitation to the field winding, and firing circuit means are connected to fire the exciter switch during the start-up period or at least within a short time interval after motor synchronization is achieved. The firing circuit means includes means for effecting post-synchronization excitation in a highly reliable manner with a minimum number of additional components. For this purpose the firing circuit includes a timing circuit and a breakdown diode which respond to a blocking condition of the exciter switch at synchronous speed and fire the exciter switch in a timely manner to enable exciting current to flow in the field winding and thereby maintain the motor at synchronous speed under load.

It is therefore an object of the invention to provide a novel synchronous motor control and excitation system which efficiently applies DC excitation to the motor field winding even if it has not been applied before synchronous speed is reached.

Another object of the invention is to provide a novel brushless synchronous motor control system which employs a timing circuit and a breakdown diode to apply DC excitation to the motor field winding after synchronization in a timely manner with improved economy of parts and operation.

These and other objects of the invention will become more apparent upon consideration of the following detailed description along with the attached drawing, in which:

FIGURE 1 is a schematic view of a brushless synchronous motor with its control and excitation system arranged in accordance with the principles of the invention;

FIG. 2 is a schematic view of a post synchronization firing circuit employed in the system of FIG. 1; and FIG. 3 shows a waveform representative of the slip voltage cycle just before motor synchronization is achieved by the effects of rotor pole saliency.

More specifically, there is shown schematically in FIG. 1 a brushless synchronous motor 10. Although the invention can be embodied to control synchronous motors having brushes and collector rings, it is especially useful in connection with brushless motor systems and the motor 10 is therefore illustrated as a brushless motor. The motor 10 may be of any suitable physical construction and has a three-phase stator winding 12, and an exciter provided with a field winding 14 which is also suitably mounted on a stator member. The stator winding 12 of the motor is suitably energized by a three-phase AC source and the exciter field winding 14 is energized by any suitable DC source. If desired, a rectifier (not shown) can provide excitation power for the exciter field 14 from the AC source.

The stator winding 12 produces a rotating magnetic field which interacts with motor field winding means 16 and the usual amortisseur windings (not shown) to produce startup and synchronous torques in the motor 10. The field winding means 16 and the amortisseur windings are suitably disposed on a predetermined number of salient rotor poles in the usual manner.

The stationary exciter field winding 14 interacts with a rotating exciter armature winding 18, shown as a three-phase winding, which generates the necessary energy for exciting the motor field winding means 16. A rotating rectifier assembly 32 connected to the exciter armature winding 18 supplies excitation current to the field winding 16, thus eliminating the need for brushes and collector rings. A common shaft (not shown) is preferably employed for the field winding means 16 and the exciter armature 18, and a control system 20 connected between the exciter armature 18 and the field winding means 16 is also mounted on the rotating portion of the machine. Those components which are within dotted box 22 in FIG. 1 are thus all subject to rotation.

Control of the excitation system is provided by the control system 20 so as normally to assure development of starting torque through induction motor action as well as the final synchronous pull-up torque by timely application of DC excitation across the field winding means 16 through a semi-conductor exciter switch 24 in a DC excitation circuit 26, 25, 28 and 30. Thereafter, DC excitation is continuously applied to the field winding means 16 so as to provide the torque necessary to drive the motor load at synchronous speed.

A rectifier arrangement 32 is connected to the exciter armature 18 for the purpose of providing DC excitation for the field winding means 16 through the DC excitation circuit. Exciting current is blocked from flowing by the exciter switch 24, in the form of a silicon controlled rectifier or other suitable semiconductor switching means, unless firing circuit means 48 (or a firing circuit 50) is operated to apply a gating pulse to gate and cathode terminals 49 and 51 and thereby fire the exciter switch 24.

During the start-up period, the induced voltage in the field winding 16 is discharged by a field resistor 23 in a field discharge circuit 25, 29 or 31 and 27 so as to prevent field winding insulation damage from open circuit induced voltages and so as to increase the torque developed by the motor 10 during the start-up period. The induced field current components of one polarity are carried through the branch 31 and diode 35 when field winding terminal 60 is positive relative to field winding terminal 58. When the polarity is reversed, the field discharge switch 33, in the form of a silicon controlled rectifier or other suitable semiconductor switching means, carries the induced field current components of the opposite polarity through the circuit branch 29 once the breakdown voltage of a Zener gate diode 37 is exceeded.

When the motor 10 reaches synchronous speed, there is substantially no induced field voltage in the field discharge circuit because the field winding means 16 is then rotating in synchronism with the rotating flux wave produced by the stator winding 12. Further, at synchronism, there is substantially no current in the field discharge resistor 23 since the diode 35 and the field discharge switch 33 normally block any flow of current from the DC excitation circuit.

Preferably, the field discharge switch 33 is normally opened before synchronous speed is reached in the manner described in a copending application Ser. No. 460,265, filed June 1, 1965 by A. H. Hoffmann and F. V. Frola and assigned to the present assignee. In the alternative, the field discharge switch 33 can shortly be opened after synchronization through the use of a semiconductor cutout switch 59 and additional associated circuitry (not shown) in the manner described in the first mentioned copending application.

Normally, the exciter switch 24 is automatically reopened by back voltage from the field winding 16 if the motor 10 should drop to a subsynchronous speed after synchronism is reached. In some applications, it may be desirable to use the cutout switch 59 to reopen the exciter switch 24. For this purpose, the cutout switch 59 is connected between an exciter switch anode terminal 70 and an exciter armature terminal 53 through a current limiting resistor 55 and a blocking diode 57. A firing circuit 61 has input terminals connected across exciter armature terminals 67 and 69 to sense the drop in motor speed. When the cutout switch 59 is fired by the circuit 61, a back voltage is applied across the exciter switch 24 by a suitably connected charging capacitor 71. A suitable circuit for use in forming the firing circuit 61 and a fuller description of the cutout switch resynchronization process is set forth in the first mentioned copending application. Since the cutout switch operation normally requires the use of a large electrolytic capacitor unit for the capacitor 71 and accordingly produces maintenance problems, it is preferred that the system parameters be arranged to produce automatic exciter switch reopening when resynchronization is required.

The firing circuit 50 normally fires the exciter switch 24 at a predetermined time in the slip voltage waveform in a manner to be described here only to the extent necessary for the present invention to be understood. One embodiment of the firing circuit 50 is disclosed in the first mentioned copending application and another embodiment of the firing circuit 50 is disclosed in the second mentioned copending application, and in each of these embodiments the firing circuit 50 fires the exciter switch 24 only if actuated by a positive half cycle of slip voltage of predetermined minimum time duration. When the term "positive field or slip" voltage is used, it is meant that the polarity of induced field voltage is such that field terminal 58 is positive relative to field terminal 60.

Generally, the firing circuit 50 has input terminals 54 and 56 connected directly to the field terminals 58 and 60 (or across the field resistor 23 at terminals 55 and 60 if desired) and further includes an energy storage timing circuit (not shown) which gates a semiconductor frequency switch (not shown) at a predetermined slip frequency (say 95% synchronous speed) and directly in response to a positive half cycle of the slip voltage waveform at that frequency. A semiconductor phase switch (not shown) is connected in series with the frequency switch so as to produce a sharp current signal or pulse through the gated frequency switch and through output coupling means (not shown) and the exciter switch gate and cathode terminals 49 and 51 as or after the slip voltage turns negative. The exciter switch 24 is thus normally fired at a predetermined time point in the slip voltage waveform and the switch firing is dependent primarily on slip voltage frequency and not to any material extent on other system factors (such as age and temperature varying switch gating or other similar component characteristics which would produce error influence in the timing of circuit operation).

As previously explained, the exciter switch 24 may remain open at synchronous speed under certain circumstances, particularly when the motor 10 is rapidly accelerated against a light or zero load. Specifically, the final cycle (FIG. 3) of slip voltage can have a positive half cycle 62 of inadequate time duration to actuate the firing circuit 50 and the exciter switch 24, and it can have a negative half cycle 64 which is of sufficiently long duration to permit the motor to pull into synchronism due to saliency of the rotor poles before another positive half cycle of slip voltage is produced. Under the conditions of rapid motor acceleration, the firing circuit 50 thus can be nonresponsive to the positive field voltage at subsynchronous speeds and the exciter switch 24 can remain open to withhold the exciting current needed in the field winding means 16 for the maintenance of synchronous speed under load. For a fuller understanding of the reasons for the described limitation on the responsiveness of the firing circuit 50, reference is made to the aforementioned copending applications.

In accordance with the principles of the present invention, the firing circuit means 48 further includes a separate firing circuit 52 which is cooperatively combined with the balance of the control system 20 so as to fire the exciter switch 24 if it is not fired prior to the time at which the motor 10 reaches synchronous speed. Although the firing circuit 52 is shown in combination with the control system 20 (which can be specifically embodied as described in either of the aforementioned copending applications), the firing circuit 52 can be employed to produce post-synchronization DC excitation in other control systems having a DC excitation circuit controlled by an exciter switch such as the exciter switch 24.

The post-synchronization firing circuit 52 senses whether exciting current is flowing and particularly whether the exciter switch 24 is conducting at a point in time after the usually effective firing circuit 50 would fire the switch 24. As its name implies, however, the post-synchronization firing circuit 52 preferably senses the state of the exciter switch 24 after the motor 10 has reached synchronous speed.

For this purpose, input terminals 68 and 71 are connected respectively to the exciter switch anode terminal 70 and the exciter switch cathode terminal 51. The potential drop across the exciter switch 24 with its time varying character is thus determinative of the operation of the firing circuit 52. Output from the firing circuit 52 is applied to the gate and cathode terminals 49 and 51 of the exciter switch 24 so as to produce a pulse or signal for firing the exciter switch 24 at the appropriate time.

The post-synchronization firing circuit 52 is shown in FIG. 2 and comprises Zener diodes 72 and 74 which are connected across the input terminals 68 and 71 through a current limiting resistor 75 to produce a clipped voltage waveform across an energy storage timing circuit 76 including a variable resistor or potentiometer 78 and a timing capacitor 80. When the capacitor voltage reaches a sufficiently high value, a two terminal semiconductor switch or breakdown diode 82 becomes conductive to produce a sharp output pulse through the terminal gate and cathode terminals 49 and 51 for firing the exciter switch 24.

A resistor 84 limits forward current in the breakdown diode 82 and diode 86 prevents reverse current flow through the breakdown diode 82. Diode 88 is connected across the timing capacitor 80 to bypass the capacitor 80 on negative half cycles of exciter switch anode-to-cathode voltage and thereby assure a zero charge on the capacitor 80 each time the anode-cathode voltage goes positive. The specific arrangement described for the post-synchronization firing circuit 52 is nearly identical with one of the resynchronization firing circuits and one of the field resistor removal firing circuits employed in the first mentioned copending application, and it is the preferred one in the present instance.

During the period of slip, the output voltage from the exciter armature 18 rises in magnitude as motor speed increases. The induced field voltage alternates in polarity with a generally constant peak magnitude in excess of the magnitude of the exciter armature voltage until the motor reaches say 80% of synchronous speed. Induced field voltage then begins to decrease in magnitude as the motor 10 accelerates to synchronous speed.

Since the exciter switch 24 is in series with the rectified output of the exciter armature 18 and with the field winding means 16, the potential drop across the anode and cathode terminals 70 and 51 of the exciter switch 24 during the slip period is the algebraic sum of the DC exciter voltage and the induced AC field voltage. Accordingly, the potential drop from the anode terminal 70 to the cathode terminal 51 fluctuates from a relatively high positive peak value to a lower positive minimum value or a negative peak value of lower absolute magnitude with decreasing frequency as the motor 10 accelerates to synchronous speed.

Whether the anode-cathode voltage is a fluctuating DC voltage or an alternating voltage depends on the relative magnitudes of the exciter and field voltages and on the proportion in which back voltage is divided between the exciter switch 24 and the rectifier 32. Preferably, by proper electrical design of the motor field winding 16 and selection of exciter maximum voltage, the anode-cathode voltage drops to at least zero volts as it flucturates during the entire motor starting process prior to synchronization. At synchronous speed the induced field voltage is substantially zero and the anode-cathode potential drop is substantially zero if the exciter switch 24 is conducting as a result of operation of the firing switch 50, and it is a positive DC value substantially equal to the rectified DC output voltage of the exciter armature 18 if the exciter switch 24 remains open at synchronism for the reasons previously given.

The timing circuit 76 in the firing circuit 52 is adjusted to produce sufficient time delay for generating a firing pulse for the exciter switch 24 at the desired point in time. Adjustment of the potentiometer 78 is thus made so that voltage rise on the timing capacitor 80 is sufficiently delayed to generate a firing pulse through the breakdown diode 82 after the motor 10 has synchronized without the aid of DC excitation. By this process, the firing circuit 52 responds to post-synchronization DC voltage across the open exciter switch 24, following failure of the firing circuit 50 to respond to the slip voltage waveform, and reacts by firing the exciter switch 24 at the preferred point in time. An RC time constant of two to three seconds is ordinarily sufficiently long to operate as a detection of motor synchronization without excitation yet it is sufficiently short to result in exciting the motor field winding 16 through the exciter switch 24 so as to allow the motor to accept its load or other torque without losing synchronism.

When the motor 10 does synchronize as a result of rotor pole saliency prior to the application of DC excitation current to the field winding means 16, the rotor poles may be either "north" or "south" magnetized by the stator magnetic poles. The firing circuit 52 operates the exciter switch 24 to apply post-synchronization DC excitation to the field winding means 16 in the manner just described, but the magnetic direction created on the rotor poles may be opposite to that required for synchronism. The motor rotor then slips one pole and the motor 10 is properly synchronized.

However, the rotor slippage can cause the exciting current to drop to zero momentarily and drive the exciter switch 24 into a blocking state. The motor 10 then continues temporarily to operate at synchronous speed and the DC voltage across the reopened exciter switch 24 reactuates the firing circuit 52. In the manner previously described, the firing circuit 52 refires the exciter switch 24 to apply DC excitation to the field winding means 16. The magnetic polarity of the rotor poles is then properly matched with the stator magnetic poles and the motor 10 continues to operate at synchronous speed.

The foregoing description has been presented only to illustrate the principles of the invention. Accordingly, it is desired that the invention be not limited by the embodiment described, but, rather, that it be accorded an interpretation consistent with the scope and spirit of its broad principles.

What is claimed is:

1. In a synchronous motor having rotating field winding means, an alternating current exciter armature rotatable with the field winding means, rectifier means connected to said exciter armature to supply direct current excitation to the field winding means, a control system comprising a discharge circuit normally open at synchronous speed and connected across the field winding means and including a resistor for discharging current induced in the field winding means at subsynchronous speeds, a semiconductor exciter switch connected in an excitation circuit between said rectifier means and the field winding means to control the direct current excitation, firing circuit means normally responsive to the slip frequency of voltage induced in the field winding means for actuating said exciter switch so as to supply motor synchronizing excitation current to the field winding means substantially at a predetermined slip voltage frequency, a firing circuit having an input connected across anode and cathode terminals of said exciter switch, said last-mentioned firing circuit including a capacitor and a resistor connected to said firing circuit input to be energized by the voltage across said exciter switch, a voltage responsive device connected to provide an output signal when the voltage of said capacitor exceeds a predetermined value of predetermined polarity, and means for applying said output signal to a gate terminal of said exciter switch to fire the exciter switch if the motor reaches synchronism before the exciter switch is fired by the first-mentioned firing circuit means.

2. In a synchronous motor having rotating field winding means, an alternating current exciter armature rotatable with the field winding means, rectifier means connected to said exciter armature to supply direct current excitation to the field winding means, a control system comprising a discharge circuit normally open at synchronous speed and connected across said field winding means and including a resistor for discharging current induced in the field winding means at subsynchronous speeds, a silicon controlled rectifier exciter switch connected in an excitation circuit between said rectifier means and the field winding means to control the direct current excitation, firing circuit means normally responsive to the slip frequency of voltage induced in the field winding means for actuating said exciter switch so as to supply motor synchronizing excitation current to the field winding means substantially at a predetermined slip voltage frequency, a firing circuit having an input connected across anode and cathode terminals of said silicon controlled rectifier switch, said last mentioned firing circuit including a capacitor and resistor connected to said firing circuit input to be energized by the voltage across said exciter switch, a diode connected across said capacitor to bypass the capacitor when said voltage is of one polarity, a breakdown diode connected to the capacitor and adapted to become conducting to provide an output signal when the voltage of the capacitor exceeds a predetermined value of opposite polarity, and means for applying said output signal to a gate terminal of said exciter switch to fire the exciter switch if the motor reaches synchronism before the exciter switch is fired by the first-mentioned firing circuit means.

References Cited
UNITED STATES PATENTS 3,100,279  8/1963  Rohner _____ 318—181

ORIS L. RADER, *Primary Examiner.*

G. RUBINSON, *Assistant Examiner.*